United States Patent
Coombs

(10) Patent No.: US 8,099,200 B2
(45) Date of Patent: Jan. 17, 2012

(54) VEHICLE INTERFACE BASED ON THE WEIGHT DISTRIBUTION OF A USER

(76) Inventor: Joshua D. Coombs, Haslett, MI (US)

(*) Notice: Subject to any disclaimer, the term of this patent is extended or adjusted under 35 U.S.C. 154(b) by 480 days.

(21) Appl. No.: 11/239,805

(22) Filed: Sep. 30, 2005

(65) Prior Publication Data

US 2007/0078577 A1 Apr. 5, 2007

(51) Int. Cl.
*G05D 1/08* (2006.01)
(52) U.S. Cl. .......................................................... 701/4
(58) Field of Classification Search ........................ 701/4
See application file for complete search history.

(56) References Cited

U.S. PATENT DOCUMENTS

| | | | |
|---|---|---|---|
| 2,834,606 A | 10/1955 | Bertrand | |
| 2,781,182 A * | 2/1957 | Ross | 244/232 |
| 3,210,027 A * | 10/1965 | Culver et al. | 244/17.23 |
| 3,451,501 A | 6/1969 | Applegate | |
| 3,506,221 A * | 4/1970 | Vidal et al. | 244/23 R |
| 3,528,633 A * | 9/1970 | Knemeyer | 244/179 |
| 3,771,359 A | 11/1973 | Shoberg | |
| 3,898,823 A * | 8/1975 | Ludeman | 70/200 |
| 3,912,260 A | 10/1975 | Rice | |
| 4,496,579 A | 1/1985 | Crame et al. | |
| 4,632,408 A | 12/1986 | Olpp et al. | |
| 4,706,072 A | 11/1987 | Ikeyama | |
| 4,869,496 A | 9/1989 | Colombo | |
| 4,906,192 A | 3/1990 | Smithard et al. | |
| 5,195,746 A * | 3/1993 | Boyd et al. | 463/37 |
| 5,252,068 A * | 10/1993 | Gryder | 434/30 |
| 5,301,900 A * | 4/1994 | Groen et al. | 244/17.25 |
| 5,489,830 A | 2/1996 | Fernandez | |
| 5,547,382 A | 8/1996 | Yamasaki et al. | |
| 5,713,794 A * | 2/1998 | Shimojima et al. | 463/36 |
| 5,792,031 A * | 8/1998 | Alton | 482/78 |
| 5,835,008 A | 11/1998 | Colemere, Jr. | |
| 5,874,892 A | 2/1999 | Antonellis et al. | |
| 5,971,091 A | 10/1999 | Kamen et al. | |
| 6,014,940 A * | 1/2000 | Jacobson | 114/271 |
| 6,032,299 A | 3/2000 | Welsh | |
| 6,060,989 A | 5/2000 | Gehlot | |
| 6,225,977 B1 | 5/2001 | Li | |
| 6,288,505 B1 | 9/2001 | Heinzmann et al. | |
| 6,293,361 B1 | 9/2001 | Mueller | |
| 6,356,190 B1 | 3/2002 | Albrecht | |
| 6,392,550 B1 | 5/2002 | Najo | |
| 6,445,303 B1 | 9/2002 | Arych | |
| 6,471,584 B1 | 10/2002 | Wada et al. | |
| 6,471,586 B1 | 10/2002 | Aiki et al. | |
| 6,595,537 B2 * | 7/2003 | Miyoshi | 280/283 |
| 6,849,032 B2 | 2/2005 | Chu | |

(Continued)

FOREIGN PATENT DOCUMENTS

DE 10309621 9/2004

(Continued)

*Primary Examiner* — Shelley Chen
(74) *Attorney, Agent, or Firm* — Jeffrey Schox

(57) ABSTRACT

In one embodiment, the invention is an interface for communicating a vehicle command from a user to a vehicle. The interface preferably includes a support system to support at least a portion of the weight of a user, a sensor system to sense the weight distribution of the user, and a processor to interpret a vehicle command based on the weight distribution of the user and to communicate the vehicle command to a vehicle.

2 Claims, 8 Drawing Sheets

U.S. PATENT DOCUMENTS

| | | |
|---|---|---|
| 6,880,855 B2 | 4/2005 | Chernoff et al. |
| 6,913,107 B2 | 7/2005 | Sato et al. |
| 7,004,271 B1 | 2/2006 | Kamen et al. |
| 7,095,317 B2 | 8/2006 | Albrecht |
| 7,125,074 B2 | 10/2006 | Real et al. |
| 7,174,976 B2 | 2/2007 | Kamen et al. |
| 7,275,607 B2 | 10/2007 | Kamen et al. |
| 2002/0145512 A1 | 10/2002 | Sleichter et al. |
| 2004/0130463 A1 | 7/2004 | Bloomquist et al. |
| 2004/0263326 A1 | 12/2004 | Albrecht |
| 2005/0065688 A1 | 3/2005 | Rao et al. |
| 2006/0260862 A1 | 11/2006 | Nishikawa |
| 2007/0074921 A1* | 4/2007 | Coombs .......... 180/315 |
| 2007/0074922 A1 | 4/2007 | Coombs et al. |
| 2007/0078569 A1 | 4/2007 | Schox et al. |
| 2007/0078577 A1* | 4/2007 | Coombs .......... 701/36 |
| 2009/0076686 A1 | 3/2009 | Schox et al. |

FOREIGN PATENT DOCUMENTS

| | | |
|---|---|---|
| EP | 0081630 | 6/1983 |
| EP | 0275665 | 7/1988 |

* cited by examiner

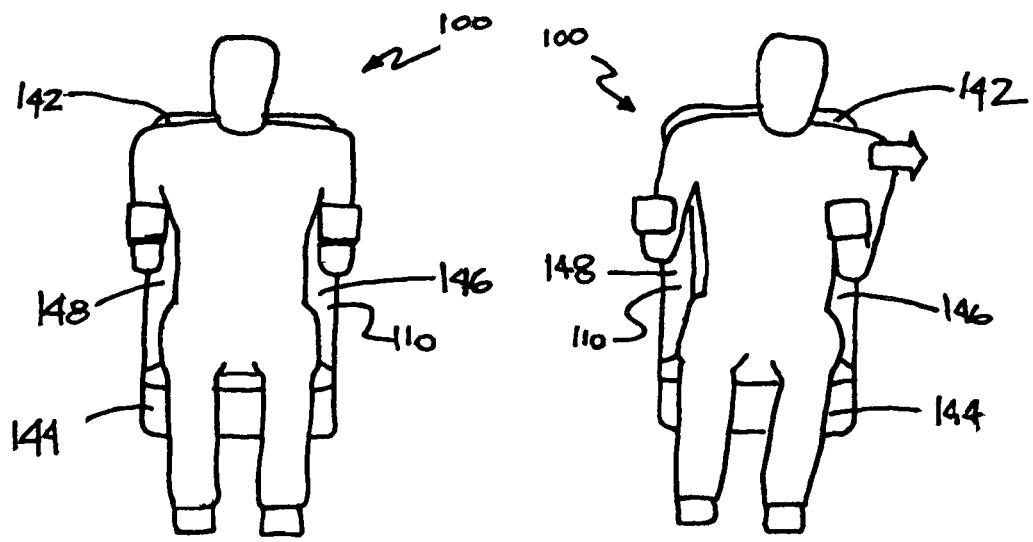
FIGURE 5A
FIGURE 5B
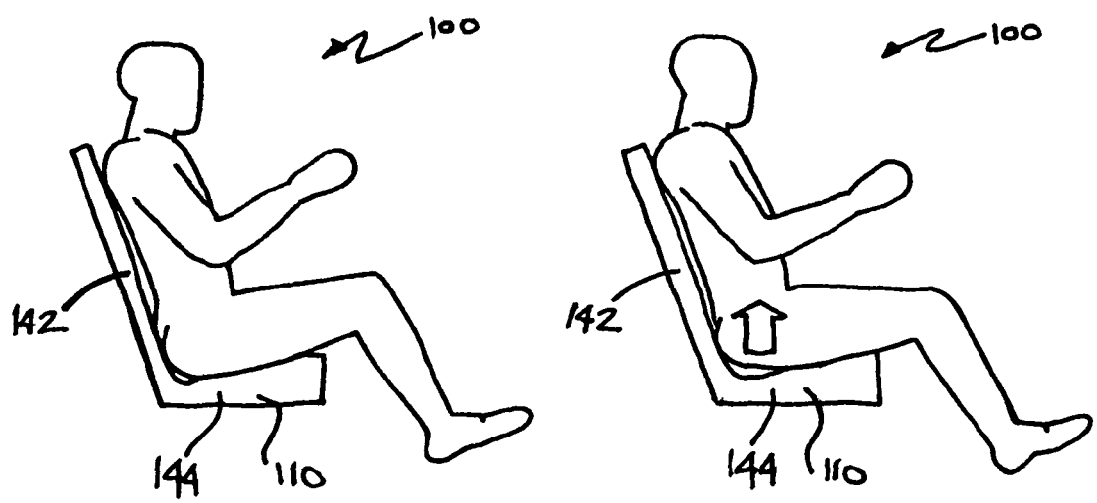
FIGURE 6A
FIGURE 6B

VEHICLE INTERFACE BASED ON THE WEIGHT DISTRIBUTION OF A USER

CROSS-REFERENCE TO RELATED APPLICATIONS

This application is related to application Ser. No. 11/239,804 entitled "Vehicle Interface Based On A Shift Of The Torso Of A User", application Ser. No. 11/239,803 entitled "Vehicle Interface Based On A Shift Of The Appendages Of A User", and application Ser. No. 11/239,963 entitled "Vehicle Interface To Communicate A Safety Alert Mode Command", which were all filed on 30 Sep. 2005 and are all incorporated in their entirety by this reference.

BRIEF DESCRIPTION OF THE FIGURES

FIGS. 4-6 include side and front views of the second preferred embodiment.

DESCRIPTION OF THE PREFERRED EMBODIMENTS

Figure 1A:
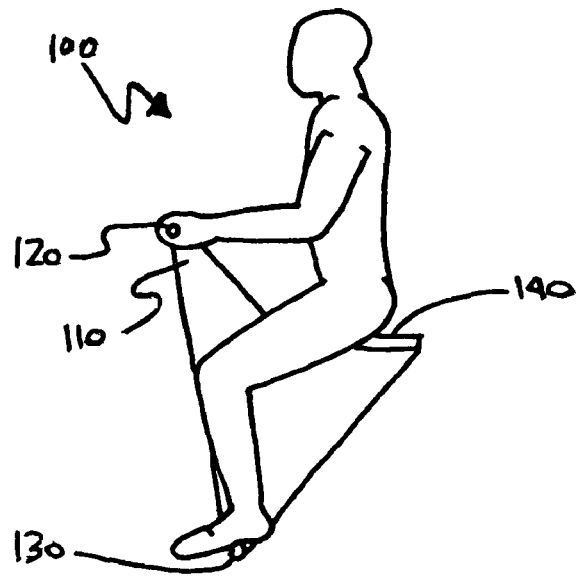
FIGS. 1-3 include side and front views of the first preferred embodiment.
Figure 1B:
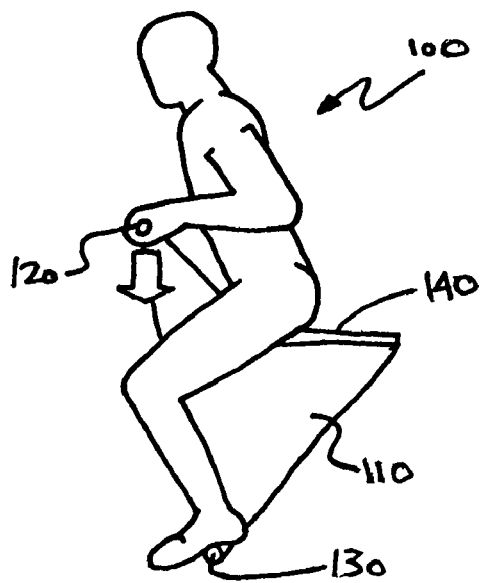
Figure 1C:
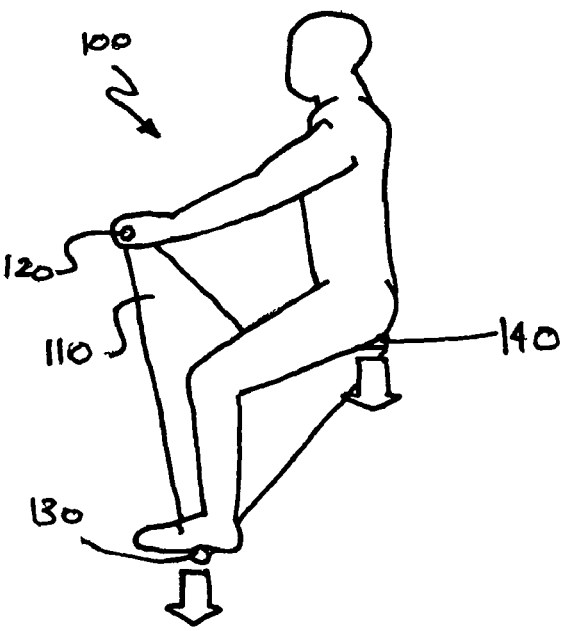

The following description of four preferred embodiments of the invention is not intended to limit the invention to these preferred embodiments, but rather to enable any person skilled in the art to make and use this invention.

As shown in the FIGS. 1-10, the interface 100 of the preferred embodiments includes an engagement system 110, a sensor system coupled to the engagement system 110, and a processor adapted to interpret a vehicle command based on an output from the sensor system and to communicate the vehicle command to a vehicle. While most of the commands are known in the art, the invention teaches a more intuitive interface to sense and interpret these commands. The invention, therefore, provides an interface 100 that senses and interprets new commands (such as a vehicle roll or pitch command in an automobile) that the user would not have been able to quickly activate with conventional interfaces, or more commands (such as a vehicle configuration command in an aircraft) that the user would not have been able to easily navigate with conventional interfaces. With this interface 100, the vehicle may be able to react better or faster to upcoming situations (such as a bump, a turn, or a climb), since the user may be able to communicate better or faster information to the vehicle. With this interface 100, the vehicle may also be able to perform better and/or the user may be able to perform with less mental or physical strain. The vehicle, it is hoped, will become a more natural (or intuitive) extension of the user with the incorporation of this invention.

The interface 100 of the preferred embodiments is preferably integrated into a vehicle. The vehicle is preferably a wheeled vehicle (such a two-wheeled bicycle or motorcycle, a three-wheeled cycle, a four-wheeled automobile, truck, or all-terrain vehicle, or a multi-wheeled tractor), a watercraft (such as a jet ski, a motorboat, or a submarine), an aircraft (such as a small plane, a helicopter, or a hovercraft), a tracked vehicle (such as a snowmobile or a tank), or a railed vehicle (such as a train). The vehicle may, however, be any suitable vehicle that transports people or cargo with either human power, fuel power, or any other suitable power source. Although the interface 100 is preferably integrated into a vehicle, the interface 100 may alternatively be remotely coupled to a vehicle or may alternatively be integrated into a virtual vehicle environment. Alternatively, the interface 100 may be integrated into any suitable environment.

The command communicated by the interface 100 of the preferred embodiment is preferably a vehicle command. The vehicle command is preferably an attitude command (such as a vehicle pitch or a vehicle roll), a handling command (such as a suspension command or a height command), a configuration command (such as a track command, a wheelbase command, a hull shape command, or a wing shape command), a mode command (such as a "safety alert mode" command), or a combination command (such as a "bunny hop" command). The command communicated by the interface 100 may, however, be any suitable command. Although the command is preferably communicated to a vehicle, the command may be communicated to any suitable device or system.

1. The Engagement System of the Preferred Embodiments

Figure 2A:
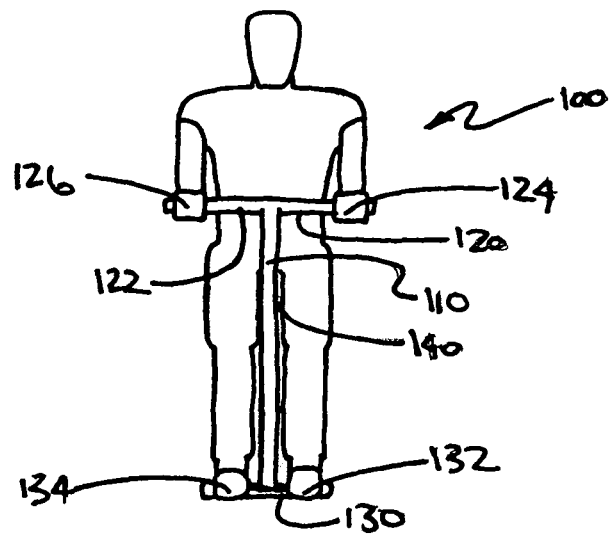
Figure 2B:
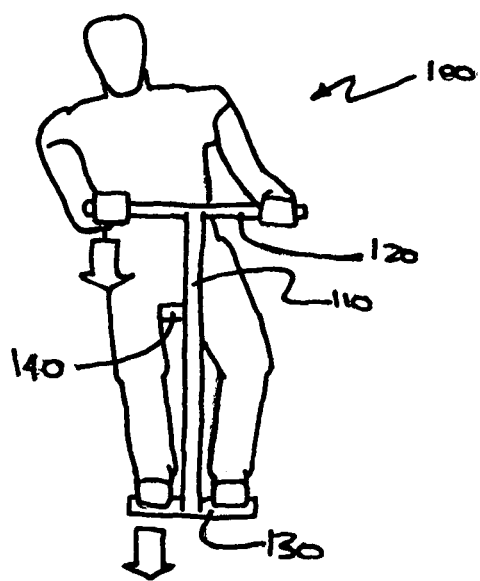

The engagement system 110 of the preferred embodiments functions to engage or support the user in the vehicle. In a first variation, as shown in FIGS. 1-3, the engagement system 110 supports at least a portion of the weight of the user, engages at least two appendages of the user, and includes: at least two of the following: a handbase 120, a footbase 130, and a seat 140. As best shown in FIG. 2A, the handbase 120 preferably includes a handlebar 122 with a left handgrip 124 engageable by the left hand of the user and a right handgrip 126 engageable by the right hand of the user. The footbase 130 preferably includes a left footrest 132 engageable by the left foot of the user and a right footrest 134 engageable by the right foot of the user. The handbase 120 and footbase 130 may alternatively include any suitable device or system to engage the hands and feet of the user. As best shown in FIG. 1A, the seat 140 preferably includes a straddle-type seat 140 (most commonly found on cycles and all-terrain vehicles) engageable by the lower torso of the user, but may alternatively include any suitable device to engage the lower torso of the user.

In a second variation, as shown in FIGS. 4-6 and 11, the engagement system 110 engages the torso of the user and includes at least two of the following: a seat back 142, a seat bottom 144, and side bolsters 146 and 148. The seat back 142 and the seat bottom 144 are preferably conventional seating elements, but may alternatively be any suitable system that engages the torso of the user, including a platform that supports the user in a prone position. The side bolsters 146 and 148 preferably include a left side bolster 146 engageable with the left side of the torso of the user and a right side bolster 148 engageable with a right side of the torso of the user. Preferably, the side bolsters 146 and 148 have an "engaged" position (FIG. 11A) in which they engage the torso of the user and a "relaxed" mode (FIG. 11B) in which they do not engage the torso user. The "engaged" and "relaxed" modes of the side bolsters 146 and 148 may be selected by the user by any suitable method (such as a finger-activated switch mounted on an instrument panel or a steering wheel, or a voice-activated switch), or may be selected by the vehicle upon the achievement of particular conditions.

Figure 7A:
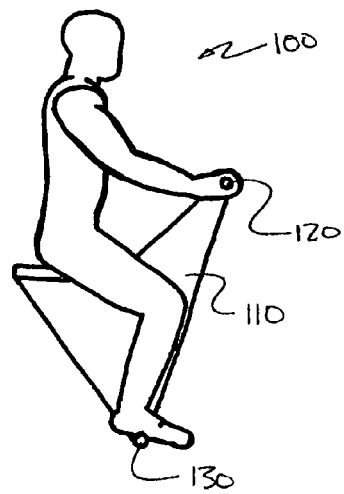
FIGS. 7-9 include side and front views of the third preferred embodiment.
Figure 7B:
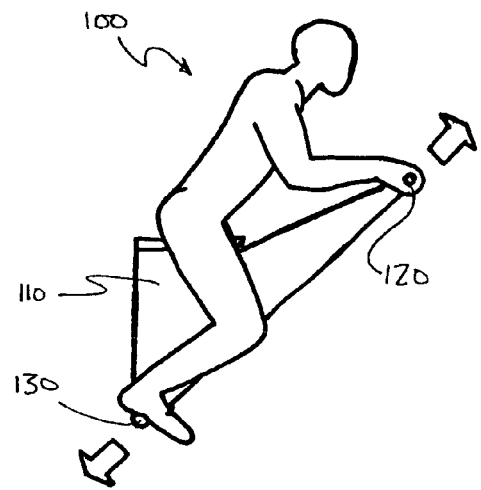
Figure 8A:
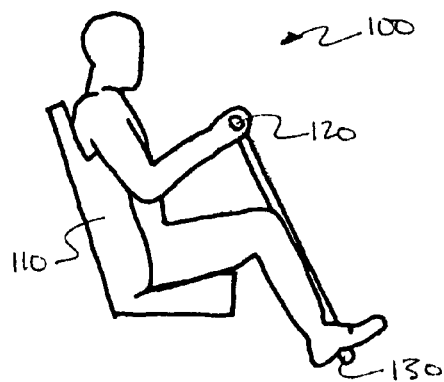
Figure 8B:
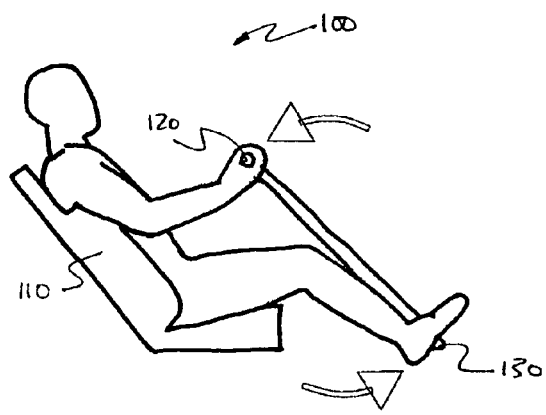
Figure 9A:
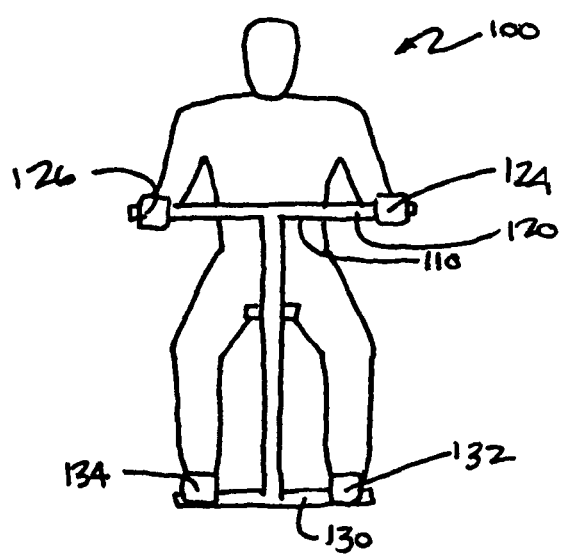
Figure 9B:
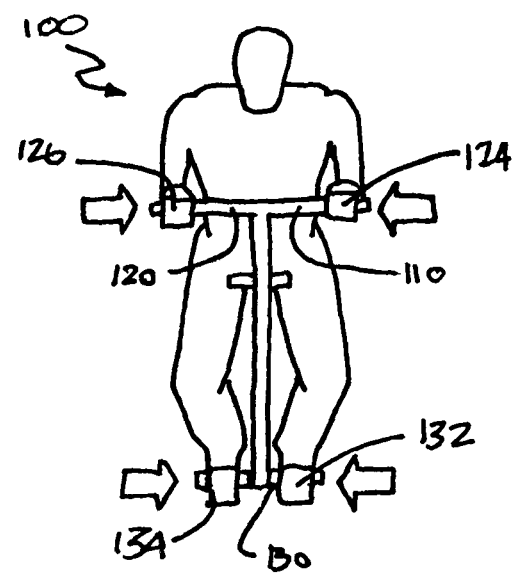

In a third variation, as shown in FIGS. 7-9, the engagement system 110 is very similar to the engagement system 110 of the first variation except that at least a portion of engagement system 110 is movable from a first position to a second position. The movable portion of the engagement system 110 preferably includes two portions that are movable in opposition directions (either linearly or rotationally) from a "near position" to a "far position", such as the handbase 120 and the footbase 130 that move in linearly opposite directions (FIG. 7) or rotationally opposite directions (FIG. 8), or the left handgrip 124 and the right handgrip 126 of the handbase 120 and/or the left footrest 132 and the right footrest 134 of the footbase 130 (FIG. 9). The movable portions of the engagement system 100 may be moved by the user, or may be moved by an actuator or any other suitable device.

In a fourth variation, as shown in FIG. 10, the engagement system 110 is very similar to the engagement system 110 of the second embodiment except that the engagement system 110 also includes a handbase 120, such as a steering wheel.

2. The Sensor System of the Preferred Embodiments

The sensor system of the preferred embodiments functions to sense an intuitive input from the user and to send a sensor output to the processor. In a first variation, as shown in FIGS. 1-3, the sensor system senses the weight distribution of the user. More particularly, the sensor system senses a shift in the weight distribution of the user. The sensor system of this variation may sense a shift in the weight distribution of the user at the handbase 120 and the footbase 130, at the seat 140 and the footbase 130, at the left handgrip 124 and the right handgrip 126, at the left footrest 132 and the right footrest 134, or at any other suitable combination within the engagement system 110. Preferably, the sensor system includes an upper load cell integrated into the handbase 120, a lower load cell integrated into the footbase 130, and a middle load cell integrated into the seat 140. Alternatively, the sensor system may include any other suitable device to sense the weight distribution of the user.

In a second variation, as shown in FIGS. 4-6, the sensor system senses forces imparted by the torso of the user. More particularly, the sensor system senses a shift (either in force or in movement) of the torso of the user. The sensor system of this variation may sense a shift of the torso of the user at the left side bolster 146, at the right side bolster 148, at the seat back 142, at the seat bottom 144. Preferably, the sensor system includes force transducers integrated into the left side bolster 146, into the right side bolster 148, into the seat back 142, and into the seat bottom 144. Alternatively, the sensor system may include any other suitable device to sense a shift (either in force or in movement) of the torso of the user.

In a third variation, as shown in FIGS. 7-9, the sensor system senses forces imparted by the appendages of the user. More particularly, the sensor system senses a shift (either in force or in movement) of the appendages of the user. The sensor system of this variation may sense a shift of the appendages of the user at the left handgrip 124 and the right handgrip 126 of the handbase 120, at the left footrest 132 and the right footrest 134 of the footbase 130, or at the handbase 120 and the footbase 130. Preferably, the sensor system includes load cells or force transducers, but may alternatively include any suitable device to sense a shift (either in force or in movement) of the appendages of the user. If the engagement system 110 includes an actuator, the actuator is preferably connected to the sensor system and arranged to move at least a portion of the engagement system 110 from a first position to a second position based on the forces sensed by the sensor system. Thus, the sensor system of this variation may be based on a shift of the forces (and may subsequently command the actuator to move at least a portion of the engagement system 110 between the first position to the second position), or the sensor system may be based on a shift of the position of the engagement system 110 by the user between the first position to the second position.

In a fourth variation, as shown in FIG. 10, the sensor system senses forces imparted by the appendages or the torso of the user. More particularly, the sensor system senses a shift (either in force or in movement) of the appendages or the torso of the user. The sensor system of this variation preferably senses a shift of the appendages at the steering wheel, or senses a shift of the torso at the seat back 142 or at the seat bottom 144. Preferably, the sensor system includes load cells or force transducers, but may alternatively include any suitable device to sense a shift (either in force or in movement) of the appendages or the torso of the user.

3. The Processor of the Preferred Embodiments

The processor of the preferred embodiments functions to receive the sensor output from the sensor system, interpret a vehicle command based on the sensor output, and communicate a vehicle command to the vehicle. The processor preferably receives the sensor output via an electrical bus integrated within the vehicle, but may alternatively receive the sensor output via any suitable device or method, such as Bluetooth RF technology. The processor may interpret the vehicle command only when there is significant information to confirm that the user indeed wishes to invoke a particular vehicle command. As an example, the processor may only invoke a vehicle roll command when the user shifts their weight distribution at both the handbase 120 and the footbase 130, and may ignore sensor output when the user only shifts their weight at only one of the handbase 120 and footbase 130. The processor preferably interprets the vehicle command based on the sensor output and other factors, such as vehicle speed, vehicle yaw rate, or any other suitable vehicle parameter. The processor may also interpret the vehicle command based on user preference, whether inputted and stored on a memory device or derived from past experiences. The processor may include a connection to a computer or a network to download new software or to upload user preferences. The processor preferably includes a conventional processor, but may alternatively include any suitable device or method to interpret a vehicle command based on the sensor output.

4. The First Preferred Embodiment

In a first preferred embodiment of the invention, as shown in FIGS. 1-3, the interface 100 includes an engagement system 110 of the first variation, a sensor system of the first variation, and a processor that interprets a vehicle command based on the weight distribution of the user. The vehicle is preferably a "ride on" vehicle, such as a two-wheeled bicycle or motorcycle, a four-wheeled all-terrain vehicle ("ATV"), a jet ski, or a snowmobile. The vehicle command is preferably an attitude command (such as a vehicle pitch or a vehicle roll) or a handling command (such as a suspension command or a height command).

The processor may be arranged to interpret a vehicle pitch command based on a shift of the weight distribution of the user at the handbase 120, at the footbase 130, and at the seat 140. As an example, if the user shifts their weight distribution from the seat 140 or footbase 130 (FIG. 1A) to the handbase 120 (FIG. 1B), the processor may interpret the user command as a "pitch forward" command. Similarly, if the user shifts their weight distribution from the handbase 120 (FIG. 1A) to the footbase 130 and/or seat 140 (FIG. 1C), the processor may interpret the user command as a "pitch rearward" command. These commands are fairly intuitive for the user since the user will want to dive down upon the approach of a downward slope, and pull up upon the approach of an upward slope of the terrain.

Figure 2C:
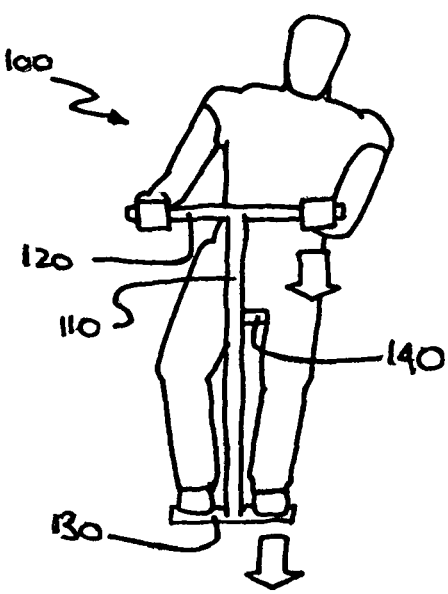
Figure 3A:
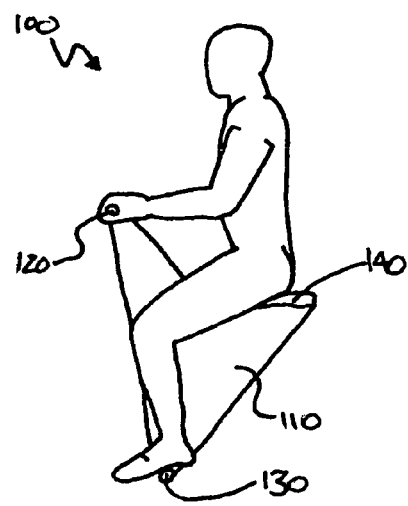
Figure 3B:
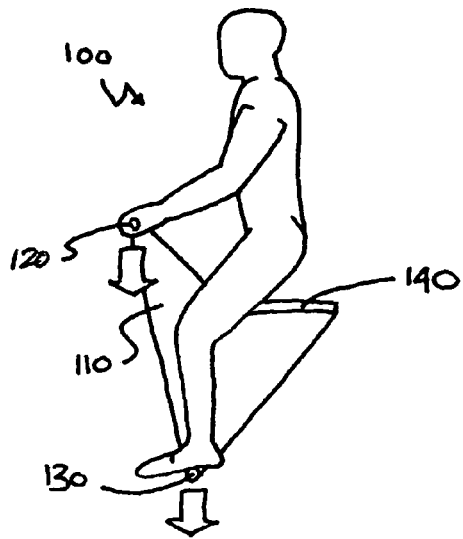
Figure 4A:
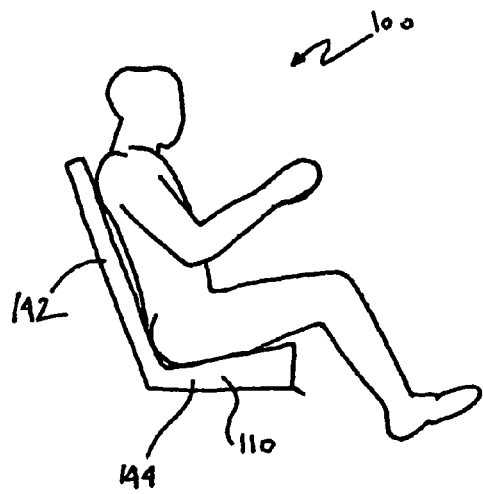
Figure 4B:
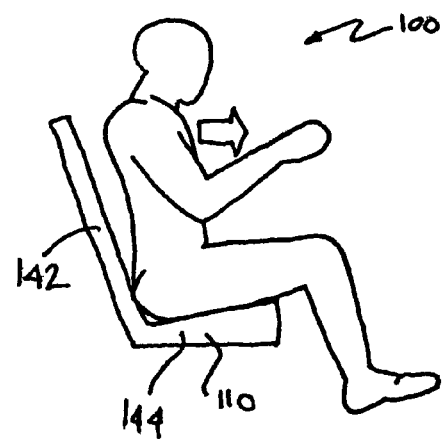

The processor may be arranged to interpret a vehicle roll command based on a shift of the weight distribution of the user at the right handgrip 126 and the left handgrip 124 of the handbase 120, or at the left footrest 132 and the right footrest 134 of the footbase 130. As an example, if the user shifts their weight distribution from a center position (FIG. 2A) to the right side of the handbase 120 and/or the footbase 130 (FIG. 2B), the processor may interpret the user command as a "roll right" command. Similarly, if the user shifts their weight distribution from a center position (FIG. 2A) to the left side of the handbase 120 and/or the footbase 130 (as shown in FIG. 2C), the processor may interpret the user command as a "roll left" command. Like riding a bicycle or a motorcycle, these commands are fairly intuitive for the user since the user will want to lean into a right turn, and lean into a left turn. This interface 100 allows the user to disconnect the roll command from the steering command, and to invoke a roll command either separate from, or significantly before, a steering command.

The processor may be arranged to interpret a vehicle height command based on a shift of the weight distribution of the user at the handbase 120, at the footbase 130, and at the seat 140. As an example, if the user shifts their weight distribution from the seat 140 (FIG. 3A) to the handbase 120 and/or footbase 130 (FIG. 3B), the processor may interpret the user command as a "height upward" command and/or a "suspension softer" command. Similarly, if the user shifts their weight distribution from the handbase 120 and/or footbase 130 (FIG. 3B) to the seat 140 (FIG. 3A), the processor may interpret the user command as a "height downward" command and/or a "suspension tighter" command. Like riding a bicycle or a motorcycle, these commands are fairly intuitive for the user since the user will want to stand up and protect their spine during rough terrain (where it is beneficial to ride at a higher height and with a softer suspension), and will want to sit back and secure their grip of the controls during high speeds (where it is beneficial to ride at a lower height and with a tighter suspension).

The processor may, of course, be arranged to interpret any particular combination or permutation of the above vehicle commands.

5. The Second Preferred Embodiment

In a second preferred embodiment of the invention, as shown in FIGS. 4-6, the interface 100 includes an engagement system 110 of the second variation, a sensor system of the second variation, and a processor that interprets a vehicle command based on a shift of the torso of the user. The vehicle is preferably a "seated" vehicle, such as a three-wheeled cycle, a four-wheeled automobile or truck, a motorboat, or a small plane or helicopter. The vehicle command is preferably an attitude command (such as a vehicle pitch or a vehicle roll) or a handling command (such as a suspension command or a height command).

The processor may be arranged to interpret a vehicle pitch command based on a shift of the torso of the user at the seat back 142 or at the seat bottom 144. As an example, if the user shifts their torso from a normal position (FIG. 4A) to a forward position (FIG. 4B), the processor may interpret the user command as a "pitch forward" command. Similarly, if the user shifts their torso rearward, the processor may interpret the user command as a "pitch rearward" command. These commands are fairly intuitive for the user since the user will want to dive down upon the approach of a downward slope, and pull up upon the approach of an upward slope of the terrain.

The processor may be arranged to interpret a vehicle roll command based on a shift of the torso of the user at the seat bottom 144 or at the side bolsters 146 and 148. As an example, if the user shifts their torso from a center position (FIG. 5A) to a leaning left position (FIG. 5B), the processor may interpret the user command as a "roll left" command. Similarly, if the user shifts their weight distribution from a center position (FIG. 5A) to a leaning right position (FIG. 5C), the processor may interpret the user command as a "roll right" command. Like taking a hard turn in an automobile, these commands are fairly intuitive for the user since the user will want to lean into a right turn, and lean into a left turn. This interface 100 allows the user to disconnect the roll command from the steering command, and to invoke a roll command either separate from, or significantly before, a steering command.

The processor may be arranged to interpret a vehicle height command based on a shift of the torso of the user at the seat back 142 or at the seat bottom 144. As an example, if the user shifts their torso from a normal position (FIG. 4A) to a forward position (FIG. 4B), the processor may interpret the user command as a "height upward" command. Similarly, if the user shifts their torso rearward, the processor may interpret the user command as a "height downward" command. Like riding in an automobile with a high or tall belt line, these commands are fairly intuitive for the user since the user will want to lean forward and increase their view of the surroundings during rough terrain (where it is beneficial to ride at a higher height), and will want to sit back and secure their grip of the controls during high speeds (where it is beneficial to ride at a lower height).

The processor may be arranged to interpret a vehicle suspension command based on a shift of the torso of the user at the seat back 142 or at the seat bottom 144. As an example, if the user shifts their torso from a normal position (FIG. 6A) to a taut position with more weight and force on the thighs and upper back of the user (FIG. 6B), the processor may interpret the user command as a "suspension softer" command. Like riding in an automobile with stiff (or no) shock absorbers, this command is fairly intuitive for the user since the user will want to lift up and protect their spine during rough terrain (where it is beneficial to ride with a softer suspension).

The processor may, of course, be arranged to interpret any particular combination or permutation of the above vehicle commands.

6. The Third Preferred Embodiment

In a third preferred embodiment of the invention, as shown in FIGS. 7-9, the interface 100 includes an engagement system 110 of the third variation, a sensor system of the third variation, and a processor that interprets a vehicle command based on a shift of the appendages of the user. The vehicle is preferably a "ride on" vehicle, such as a two-wheeled bicycle or motorcycle, a four-wheeled all-terrain vehicle ("ATV"), a jet ski, or a snowmobile. The vehicle command is preferably a configuration command (such as a wheelbase command, a track command, a hull shape command, or a wing shape command).

The processor may be arranged to interpret a vehicle pitch command based on a shift in opposite directions of the appendages of the user at the handbase 120 and/or at the footbase 130. As an example, if the appendages of the user impart a force that tends to bias the handbase 120 and the footbase 130 in linearly opposite directions (FIG. 7) or rotationally opposite directions (FIG. 8), or that tends to bias the left handgrip 124 and the right handgrip 126 toward each other and/or the left footrest 132 and the right footrest 134 toward each other (FIG. 9), then the processor may interpret the user command as a vehicle "speed mode" command. Similarly, if the appendages of the user impart a force that tends to bias the handbase 120 and the footbase 130 toward each other, tends to bias the left handgrip 124 and the right handgrip 126 in opposition directions, or tends to bias the left footrest 132 and the right footrest 134 in opposition directions, then the processor may interpret the user command as a vehicle "maneuverability mode" command. Like riding a bicycle or a motorcycle, these vehicle commands are fairly intuitive for the user since the user will want to minimize their aerodynamic drag during high speed, and will want to maximize their stability during high maneuverability.

The vehicle, notified with this vehicle configuration command, may take appropriate actions, such as changing the wheelbase (the distance between the front wheels and the rear wheels) or the track (the distance between the left wheels and the right wheels) of a four wheeled automobile, changing the shape of the hull of a motorboat or the wing shape of an aircraft, or deploying stabilizer surfaces or fins on a land vehicle, a watercraft, or an aircraft.

The processor may, of course, be arranged to interpret any particular combination or permutation of the above vehicle commands.

7. The Fourth Preferred Embodiment

Figure 10A:
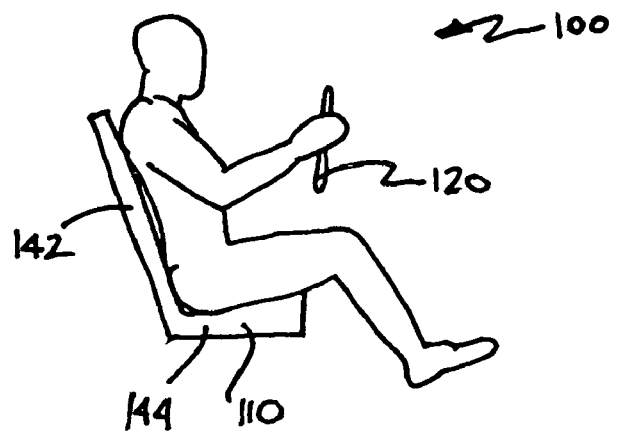
FIG. 10 includes side views of the fourth preferred embodiment.
Figure 10B:
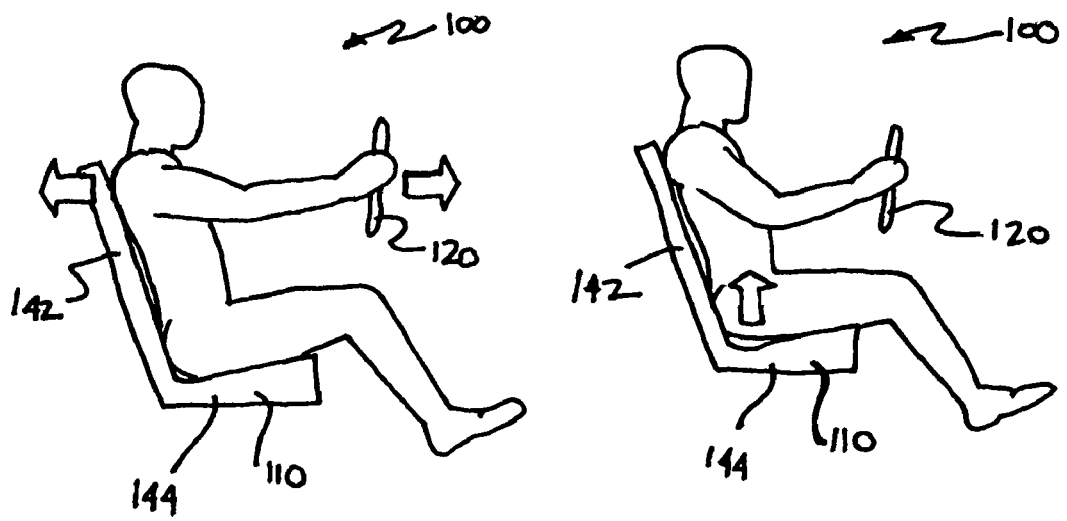
Figure 10C:
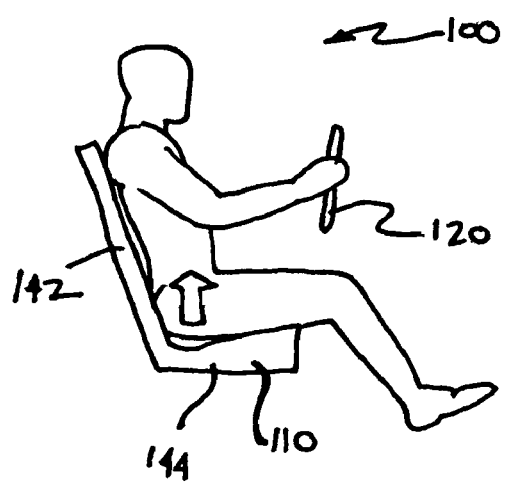
Figure 11A:
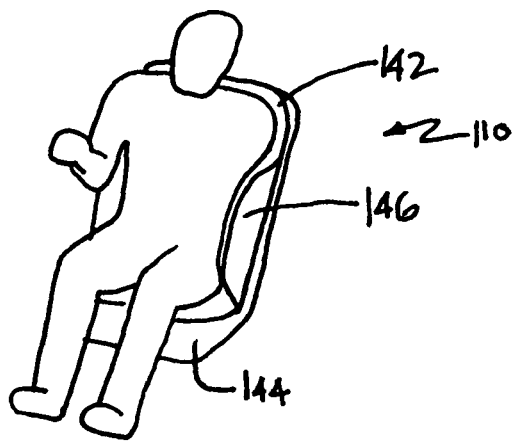
FIG. 11 includes isometric views of the second variation of the engagement system, showing the seat bolsters in an "engaged" mode and a "relaxed" mode.
Figure 11B:
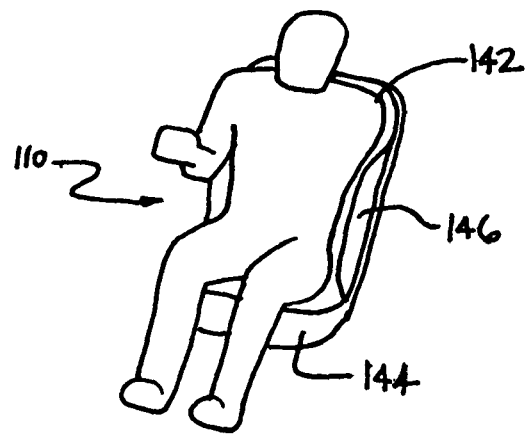

In a fourth preferred embodiment of the invention, as shown in FIGS. 10A, 10B, and 10C, the interface 100 includes an engagement system 110 of the fourth variation, a sensor system of the fourth variation, and a processor that interprets a vehicle command based on a shift of the appendages or the torso of the user. The vehicle is preferably a "seated" vehicle, such as a three-wheeled cycle, or a four-wheeled automobile or truck. The vehicle command is preferably a mode command (such as a vehicle mode command).

The processor may be arranged to interpret a vehicle "safety alert mode" command based on a shift of the appendages at the steering wheel or a shift of the torso of the user at the seat back 142 or at the seat bottom 144. As an example, if the user forcefully shifts their appendages forward into the steering wheel and/or shifts their torso rearward into the seat back 142 (FIG. 10B) or shifts their torso upward and out from the seat bottom 144 (FIG. 10C), the processor may interpret the user command as a vehicle "safety alert mode" command. This command is fairly intuitive for the user since the user will want to brace themselves in the event of a perceived potential collision of their vehicle. The vehicle, armed with this vehicle "safety alert mode" command, may take defensive actions, such as tightening the suspension, lowering the vehicle, inflating an external and/or internal airbag, or any other suitable action. The vehicle command may be communicated to the vehicle of the user, or may be broadcasted to multiple vehicles. Since the user may be able to sense a potential collision better than an avoidance system of the vehicle, the vehicle "safety alert mode" command may be able to save lives.

The processor may, of course, be arranged to interpret any particular combination or permutation of the above vehicle commands.

Although omitted for conciseness, the preferred embodiments include every combination and permutation of the various engagement systems, the sensor systems, the processors, the vehicles, and the vehicle commands. The preferred embodiments also include every combination of multiple engagement systems, the sensor systems, the processors, the vehicles, and the vehicle commands. As an example, the processor may be arranged to interpret a "bunny hop" command, which may be a combination of a vehicle "pitch forward" command, a vehicle "pitch rearward" command, and a vehicle "height upward" command.

As a person skilled in the art of recognize from the previous detailed description and from the figures and claims, modifications and changes can be made to the preferred embodiments of the invention without departing from the scope of this invention defined in the following claims.

I claim:

1. An interface for communicating a vehicle attitude command from a user to a wheeled vehicle that includes a steering system capable receiving a steering command and turning at least one of the wheels of the vehicle and an attitude adjustment system capable of actively changing the roll of the vehicle, comprising:
   a support system adapted to support at least a portion of the weight of a user; wherein the support system includes a left support adapted to support the left weight of the user and a right support adapted to support the right weight of the user,
   a sensor system coupled to the support system, wherein the sensor system includes a left sensor coupled to the left support and a right sensor coupled to the right support, wherein the sensor system is adapted to sense a shift in the weight distribution of the user between the left support and the right support, and
   a processor coupled to the sensor system, wherein the processor interprets a vehicle roll command based on the shift in weight distribution between the left and right supports and communicates the vehicle roll command to the attitude adjustment system of the vehicle, and wherein the vehicle attitude command is distinct from the steering command and disconnected from the steering system.

2. An interface for communicating a vehicle attitude command from a user to a wheeled vehicle that includes a steering system capable receiving a steering command and turning at least one of the wheels of the vehicle and an attitude adjustment system capable of actively changing the pitch of the vehicle, comprising:
   a support system adapted to support at least a portion of the weight of a user, wherein the support system includes a foot base, and a seat, a handbase,
   a sensor system coupled to the support system, wherein the sensor system includes a foot sensor coupled to the foot base, a seat sensor coupled to the seat, and a handbase sensor coupled to the handbase, wherein the sensor system is adapted to sense a shift in the weight distribution of the user between the foot base, the seat, and the hand base, and
   a processor coupled to the sensor system, wherein the processor interprets a vehicle pitch command based on the shift in weight distribution between the foot base, the seat, and the hand base and communicates the vehicle pitch command to the attitude adjustment system of the vehicle, and wherein the vehicle attitude command is distinct from the steering command and disconnected from the steering system.

* * * * *

UNITED STATES PATENT AND TRADEMARK OFFICE
CERTIFICATE OF CORRECTION

PATENT NO. : 8,099,200 B2
APPLICATION NO. : 11/239805
DATED : January 17, 2012
INVENTOR(S) : Joshua D. Coombs It is certified that error appears in the above-identified patent and that said Letters Patent is hereby corrected as shown below:

In column 8, line 19, "system capable receiving" should read --system capable of receiving--

In column 8, line 24, "weight of a user; wherein the" should read --weight of a user, wherein the--

In column 8, line 44, "system capable receiving" should read --system capable of receiving--

Signed and Sealed this
Seventeenth Day of April, 2012

David J. Kappos
*Director of the United States Patent and Trademark Office*